(12) United States Patent
Koyama

(10) Patent No.: US 7,018,574 B2
(45) Date of Patent: Mar. 28, 2006

(54) PROCESS FOR REMOVING VOLATILE COMPONENTS IN POLYARYLENE SULFIDE

(75) Inventor: Yoshinari Koyama, Chiba (JP)

(73) Assignees: Idemitsu Kosan Co., Ltd., Tokyo (JP); Petroleum Energy Center, a Juridical Incorporated Foundation, Tokyo (JP)

( * ) Notice: Subject to any disclaimer, the term of this patent is extended or adjusted under 35 U.S.C. 154(b) by 324 days.

(21) Appl. No.: 10/368,564

(22) Filed: Feb. 20, 2003

(65) Prior Publication Data

US 2004/0164439 A1 Aug. 26, 2004

(51) Int. Cl.
  *B29C 47/76* (2006.01)

(52) U.S. Cl. .............. 264/102; 264/211.21; 264/211.23

(58) Field of Classification Search ................ 264/102, 264/211.23, 211.21; 425/203, 208
See application file for complete search history.

(56) References Cited

U.S. PATENT DOCUMENTS

| | | | |
|---|---|---|---|
| 3,335,111 A * | 8/1967 | Pray et al ...................... 526/65 |
| 3,707,528 A * | 12/1972 | Miles .......................... 528/481 |
| 3,963,558 A * | 6/1976 | Skidmore .................... 159/2.2 |
| 3,992,500 A * | 11/1976 | Kruder et al. ............... 264/102 |
| 4,065,532 A * | 12/1977 | Wild et al. ..................... 264/68 |
| 4,746,482 A * | 5/1988 | Ribbing et al. ............. 264/102 |
| 5,102,591 A * | 4/1992 | Hasson et al. ............. 264/45.9 |
| 5,306,803 A * | 4/1994 | Arlt et al. .................... 528/480 |
| 5,314,972 A * | 5/1994 | Nesheiwat et al. .......... 525/537 |
| 6,210,098 B1 * | 4/2001 | Cohn et al. .................. 414/537 |
| 6,469,091 B1 * | 10/2002 | Murakami et al. .......... 524/492 |
| 6,613,128 B1 * | 9/2003 | Simonaru et al. ............. 95/260 |
| 6,646,105 B1 * | 11/2003 | Shirota ........................ 528/388 |
| 6,833,096 B1 * | 12/2004 | Wang et al. ................. 264/102 |
| 2002/0028859 A1 * | 3/2002 | Maeda ........................ 523/218 |
| 2004/0087758 A1 * | 5/2004 | Shirota ........................ 528/388 |

OTHER PUBLICATIONS

Plastics Extrusion Technology, 2nd ed., Allan L. Griff, Reihold Book Corp., 1985, pp. 14, 15, 284, 285.*

* cited by examiner

*Primary Examiner*—Mark Eashoo
(74) *Attorney, Agent, or Firm*—Oblon, Spivak, McClelland, Maier & Neustadt, P.C.

(57) ABSTRACT

There is disclosed a process for removing volatile components in a polyarylene sulfide resin which is produced by subjecting a sulfur source and a dihalogenated aromatic compound to polymerization reaction in an aprotic organic solvent, comprising using an extruder which is equipped with front vent having an opening length in the range of 4D to 11D (D: screw diameter) and which has a distance between a terminal position of a screw in a kneading portion and the opening portion of the front vent being in the range of 4D to 15D. The process is capable of steadily and economically removing volatile components in the polyarylene sulfide resin without necessitating expensive machinery or equipment such as a dryer without plugging up the opening portion of a vent even in the case of degassing a PAS resin having a low molecular weight and further, thus enabling a long-term continuous stable running.

20 Claims, 1 Drawing Sheet kneading portion

PROCESS FOR REMOVING VOLATILE COMPONENTS IN POLYARYLENE SULFIDE

BACKGROUND OF THE INVENTION

1. Field of the Invention

The present invention relates to a process for removing volatile components in a polyarylene sulfide resin in the production of the polyarylene sulfide resin. More particularly, it pertains to a process for removing volatile components in a polyarylene sulfide resin which process is capable of steadily and economically removing volatile components in the polyarylene sulfide resin well suited for use in electrical parts, electronic parts and highly rigid materials by means of a simple and convenient installation without necessitating expensive machinery or equipment such as a dryer, and further enables a long-term continuous running.

2. Description of the Related Arts

In the production of a polyarylene sulfide (hereinafter sometimes referred to as "PAS") resin, it has been contrived to enhance a cleaning efficiency and simplify the production process by directly cleaning a polymerization reaction mixture at a high temperature for a PAS resin which is produced by subjecting a sulfur source and a dihalogenated aromatic compound to polymerization reaction. However in the above-mentioned case, a large amount of volatile components are contained in a solution of a PAS resin in a molten state in an organic solvent which solution is separated after the cleaning of the polymerization reaction mixture for a PAS resin, whereby it is made necessary to remove the volatile components as mentioned above in order to produce a high quality PAS resin. The volatile components have heretofore been removed by cleaning and drying granulated PAS resin, but the method is involved in such a problem as requiring a large amount of cleaning water and at the same time, expensive machinery and equipment such as a dryer.

As a countermeasure against the aforesaid problem, U.S. Pat. No. 3,707,528 discloses that a PAS resin containing a minimized amount of impurities can simply and conveniently be produced by flashing a polymerization reaction slurry liquid for PAS resin so as to recover the volatile components. In addition, Japanese Patent Application Laid-Open No. 290376/2000 (Heisei 12) discloses a process for removing volatile components in a PAS resin which contains an aprotic organic solvent separated from polymerization reaction mixture for a PAS resin by the use of an extruder.

However, the above-cited U.S. Pat. No. 3,707,528 is involved in such a problem that a long retention time of the PAS resin in a flash drum sometimes gives rise to deterioration of the polymer therein, and the resultant deteriorated product plugs up the outlet of the drum, and the like problem. The above-cited Japanese Patent Application Laid-Open No. 290376/2000 is involved in such a problem that the volatile components are accompanied with a PAS resin, which adheres to the opening portion of a vent to plug up the opening portion at the time of degassing, hence deteriorating the performance of removing volatile components. The above-mentioned tendency is particularly remarkable in the case of a PAS resin having a low molecular weight, thereby making it impossible to carry out a long-term continuous running.

SUMMARY OF THE INVENTION

The present invention has been made in the light of the above-mentioned subject.

Thus, a general object of the present invention is to provide a process for removing volatile components in a polyarylene sulfide resin which process is capable of steadily and economically removing volatile components in the polyarylene sulfide resin well suited for use in electrical parts, electronic parts and highly rigid materials by means of a simple and convenient installation without necessitating expensive machinery or equipment such as a dryer.

Another object of the present invention is to provide a process for removing volatile components in a polyarylene sulfide resin by the use of an extruder which process is capable of steadily removing volatile components in the polyarylene sulfide resin without plugging up the opening portion of a vent even in the case of degassing a PAS resin having a low molecular weight and further, enables a long-term continuous running.

Other objects of the present invention will become obvious from the text of the specification hereinafter disclosed.

In such circumstances, intensive extensive research and investigation were accumulated by the present inventors in order to achieve the above-mentioned objects. As a result, it has been found that the objects of the present invention can be achieved, that is, an aprotic organic solvent can readily be removed from a polyarylene sulfide, and further volatile components can steadily be removed without plugging up the opening portion of a vent by the use of an extruder equipped with one or more vents each having a specific size and being located at a specific position. The present invention has been accomplished on the basis of the foregoing findings and information.

Specifically, the present invention provides a process for removing volatile components in a polyarylene sulfide resin which is produced by subjecting a sulfur source and a dihalogenated aromatic compound to polymerization reaction in an aprotic organic solvent, comprising using an extruder which is equipped with front vent having an opening length in the range of 4D to 11D, wherein D stand for screw diameter and which has a distance between a terminal position of a screw in a kneading portion and the opening portion of the front vent being in the range of 4D to 15D.

DESCRIPTION OF THE PREFERRED EMBODIMENTS

Figure 1:
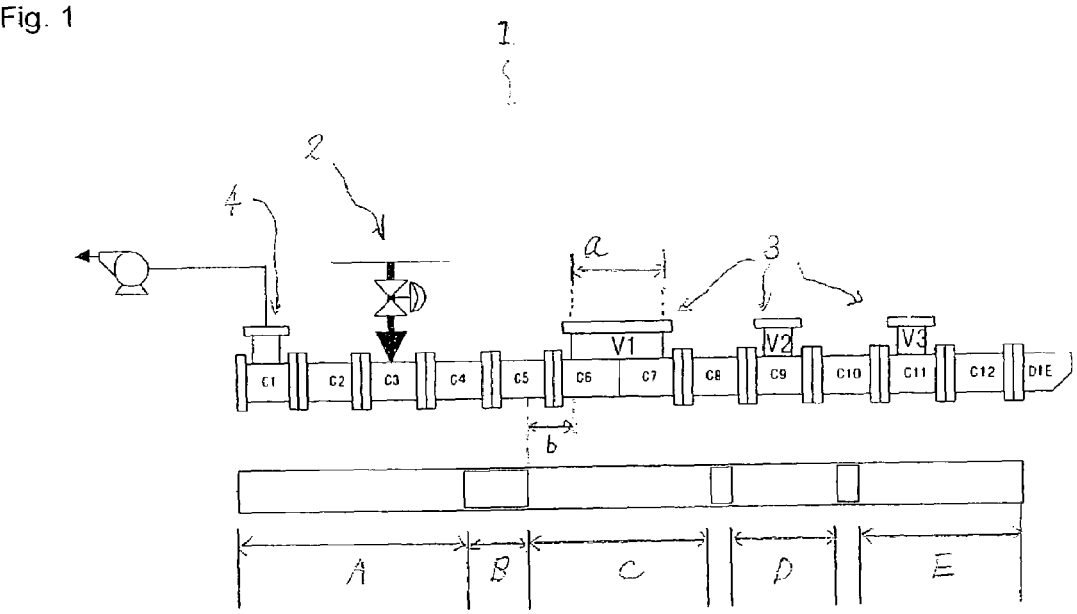
FIG. 1 is a schematic cross sectional view showing one example of a twin-screw extruder which is used in the process for removing volatile components according to the present invention.

In the following, more detailed description will be given of the present invention.

In the process according to the present invention, the polyarylene sulfide resin which is produced by subjecting a sulfur source and a dihalogenated aromatic compound to polymerization reaction in an aprotic organic solvent is subjected to volatile component removal by the use of an extruder which is equipped with one or more vents.

The extruder to be used in the process according to the present invention is an extruder which is equipped with at least one vent including a front vent. The form and shape of the extruder are not specifically limited provided that the front vent has an opening length in the range of 4D to 11D, wherein D stands for a screw diameter and has a distance between a terminal position of a screw in a kneading portion and the opening portion of the front vent being in the range of 4D to 15D. Usually, a twin-screw extruder equipped with the aforesaid front vent is preferably used.

The number of vents for the above-mentioned twin-screw extruder can be properly optionally selected in accordance with the amount of the volatile components, and it may be one. However, a twin-screw extruder equipped with two or more vents is preferably used. The position of any of the vents may be either on the rear side or front side of the feed port of the extruder, and it is preferable that at least the vent on the front side thereof has an opening portion at a specific position with a specific size as mentioned before.

The opening length of the front vent, when being less than 4D, causes the volatile components to be accompanied with the PAS resin at the time of degassing, which adheres to the opening portion and plugs up the opening, thus deteriorating the performance of removing volatile components. On the contrary, the opening length thereof, when being more than 11D, leads to a rise in resin temperature, unreasonably enlarged machinery and equipment, unfavorable increase in investment cost and liability to the occurrence of contact between the screw and barrel, thereby impairing safe operation. Judging from the viewpoints mentioned above, the opening length of the front vent is more preferably in the range of 5.5D to 9D.

On the other hand, the distance between a terminal position of a screw in a kneading portion and the opening portion of the front vent, when being less than 4D, causes the volatile components to be accompanied with the PAS resin at the time of degassing, which adheres to the opening portion and plugs up the opening, thus deteriorating the performance of removing volatile components. On the contrary, the above-stated distance, when being more than 15D, leads to a rise in resin temperature, unreasonably enlarged machinery and equipment, unfavorable increase in investment cost and liability to the occurrence of contact between the screw and barrel, thereby impairing safe operation. Judging from the viewpoints mentioned above, the distance between a terminal position of a screw in a kneading portion and the opening portion of the front vent is more preferably in the range of 5.5D to 12D.

In the case where the extruder is equipped with two front vents in the present invention, when at least one of the front vents nearest to the feed side has an opening portion at a specific position with a specific size, the working effect of the present invention can effectively be exhibited. In addition, it is more preferable that at least two vents have each an opening portion at a specific position with a specific size, and it is particularly preferable that all the front vents have each an opening portion at a specific position with a specific size.

FIG. 1 is a schematic cross sectional view showing one example of a twin-screw extruder which is used in the process for removing volatile components according to the present invention. The twin-screw extruder as illustrated on FIG. 1 is composed of a feed portion 2 which introduces the PAS resin in molten state containing an aprotic organic solvent, front vents 3 consisting of vents V1, V2 and V3 that are placed on the front side, a rear vent 4 placed on the rear side, screws (not shown on the drawing) which agitate, knead and transport the PAS resin, and the like. By the term "the opening length of the front vent" as used herein is meant the length "a" in the case of V1 in FIG. 1. "The distance between the terminal position of a screw in a kneading portion and the opening portion of the front vent" is meant the length "b" in the case of V1 in FIG. 1, which is the distance between a terminal position of a kneading screw in a kneading portion and the terminal position of the feed side for the vent V1.

Figure 2:
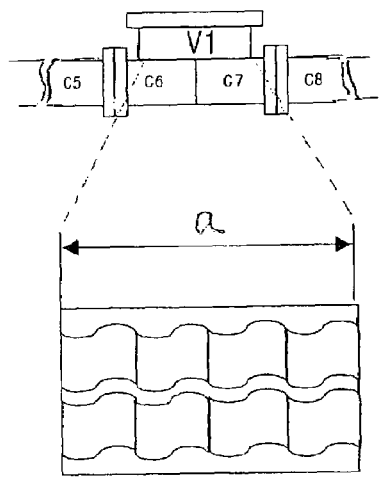
FIG. 2 and FIG. 3 are each a fragmentary cross sectional view showing the above-mentioned twin-screw extruder.
Figure 3:
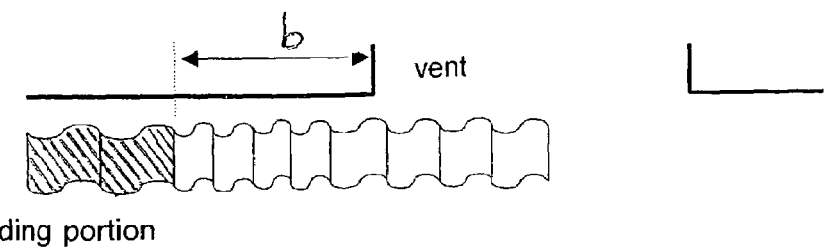

FIG. 2 and FIG. 3 are each a fragmentary cross sectional view showing the above-mentioned twin-screw extruder. In FIG. 2, the opening length of the vent V1 is denoted as "a", while in FIG. 3, the distance between the terminal position of a screw in a kneading portion and the opening portion of the front vent V1 is denoted as "b".

In the process according to the present invention, the PAS resin in molten state which has been separated from the polymerization reaction product and heated usually to 265 to 300° C. and which contains an aprotic organic solvent is introduced into the twin-screw extruder 1 through the feed portion 2, where most of the aprotic organic solvent is removed in the region A, the PAS resin is agitated, uniformized and heated to raise the temperature in the region B, so that the degassing is accelerated. Further in each of the regions C, D and E, the resin is degassed and refined through the front vents V1, V2 and V3. The resin temperature at the time of degassing is preferably in the range of 280 to 400° C. The resin temperature, when being lower than 280° C., sometimes gives rise to insufficient degassing and/or unstable resin flow, whereas the resin temperature, when being higher than 400° C., causes the resin to be decomposed as the case may be.

The pressure in the front vent portion 3 is not specifically limited provided that it is in the range enabling the removal of volatile components. It is usually maintained under reduced pressure (760 mm Hg or lower). In order to enhance the degassing efficiency, the pressure therein is preferably under substantial vacuum, more preferably 0 to 660 Torr, particularly preferably 0 to 30 Torr. Further, the pressure in the rear vent 4 is preferably 50 to 760 Torr, particularly preferably 260 to 660 Torr.

The PAS resin, after being treated with the twin-screw extruder, is extruded through a die nozzle at a temperature in the range of 280 to 350° C., preferably 290 to 340° C., more preferably 300 to 320° C. into cooling water at a temperature in the range of 40 to 95° C. Thereafter the PAS resin is cut off and pelletized to afford PAS resin in which volatile components are removed. The aforesaid die nozzle temperature, when being higher than 350° C., results in liability to deterioration of the PAS resin, whereas the temperature, when being lower than 280° C., sometimes gives rise to solidification thereof, whereby extrusion is made impossible.

As the aprotic organic solvent to be used in the process according to the present invention, there is preferably usable an aprotic polar organic solvent, for instance, an amide compound, lactam compound, urea compound, organosulfur compound and cyclic organophosphorus compound alone or as a mixed solvent.

The above-mentioned amide compounds among aprotic organic polar solvents are exemplified by N,N-dimethylformamide; N,N-diethylformamide; N,N-dimethyl-acetoamide; N,N-diethylacetoamide; N,N-dipropylacetoamide; N,N-dimethylbenzoic acid amide, etc.

The above-mentioned lactam compounds are exemplified by N-alkyl-caprolactam such as caprolactam; N-methylcaprolactam; N-ethyl-caprolactam; N-isopropylcaprolactam; N-isobutylcaprolactam; N-n-propylcaprolactam; N-n-butyl-caprolactam; and N-cyclohexylcaprolactam; N-methyl-2-pyrrolidone (NMP); N-ethyl-2-pyrrolidone; N-isopropyl-2-pyrrolidone; N-isobutyl-2-pyrrolidone; N-n-propyl-2-pyrrolidone; N-n-butyl-2-pyrrolidone; N-cyclohexyl-2- pyrrolidone; N-methyl-3-methyl-2-pyrrolidone; N-ethyl-3-methyl-2-pyrrolidone; N-methyl-3,4,5-trimethyl-2-pyrrolidone; N-methyl-2-piperidone; N-ethyl-2-piperilidone; N-isopropyl-2-piperidone; N-methyl-6-methyl-2-piperidone; N-methyl-3-ethyl-2-piperidone, etc.

The above-mentioned urea compounds are exemplified by tetramethylurea; N,N'-dimethylethyleneurea; N,N'-dimethylpropyleneurea, etc.

The above-mentioned organosulfur compounds are exemplified by dimethylsulfoxide; diethylsulfoxide; diphenylsulfone; 1-methyl-1-oxosulfolane; 1-ethyl-1-oxosulfolane; 1-phenyl-1-oxosulfolane etc.

The above-mentioned cyclic organophosphorus compounds are exemplified by 1-methyl-1-oxophosfolane; 1-n-propyl-1-oxophosfolane; 1-phenyl-1-oxophosfolane; etc.

Any of the above-exemplified aprotic organic polar solvent can be used alone or by mixing with at least one other or by mixing with a solvent which is not cited above and does not impair the object of the present invention, for instance, water and para-dichlorobenzene (PDCB) so as to enable the mixture to be used as the foregoing aprotic organic solvent.

Of the various aprotic organic solvents as exemplified above, are preferable N-alkylcaprolactam and N-alkylpyrrolidone, among which N-methyl-2-pyrrolidone (NMP) is particularly preferable.

The temperature at which the PAS resin is molten in the aprotic organic solvent, although depending upon the chemical compositions of the PAS and the aprotic organic solvent, is usually in the range of preferably 220 to 350° C. The term "molten state" as used herein is meant the molten state wherein the PAS resin is molten in the aprotic organic solvent at a temperature in the range of preferably 235 to 350° C., more preferably 235 to 290° C., particularly preferably 240 to 275° C.

The PAS resin to which the process according to the present invention is applicable is, for instance, a polymer having at least 70 mole % of the repeating unit represented by —Ar—S— wherein Ar is an arylene group and S is a sulfur atom. A typical example thereof includes an polyarylene sulfide having at least 70 mole % of the repeating unit represented by the following general formula (I):

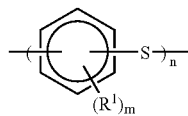

wherein $R^1$ is a substituent selected from an alkyl group having at most 6 carbon atoms, an alkoxy group, a phenyl group, a carboxylic acid, a metal salt, an amino group, a nitro group and a halogen atom such as a fluorine atom, chlorine atom and bromine atom; m is an integer from 0 to 4; and m stands for average degree of polymerization and is in the range of 10 to 200.

The present invention is applicable not only to the homopolymer but also to a copolymer. Examples of the constituting unit of the copolymer include meta-phenylene sulfide unit; ortho-phenylene sulfide unit; p,p'-diphenyleneketone sulfide unit; p,p'-diphenylenesulfone sulfide unit; p,p'-biphenylene sulfide unit; p,p'-di-phenylene methylene sulfide unit; p,p'-diphenylenecumenyl sulfide unit; and naphthyl sulfide unit.

The molecular structure of the polyarylene sulfide may be any of linear structure, branched structure and crosslinked structure.

That is to say, as the PAS resin to which the process according to the present invention is applicable, there are usable not only the polyarylene sulfide having a substantially linear structure, but also a branched or crosslinked polyarylene sulfide in which a small amount of monomer having at least three functional groups as a part of monomers is polymerized, and a blended polymer in which the polyarylene sulfide just cited is blended with the foregoing substantially linear polymer.

Moreover, as the PAS resin to which the process according to the present invention is applicable, there is usable a polyarylene sulfide polymer in which its melt viscosity is increased so as to improve its moldability by oxidative crosslinking or thermal crosslinking of the polymer having a relatively low molecular weight and substantially linear structure.

The process according to the present invention is applicable, for instance, to a reaction product produced by subjecting a dihalogenated aromatic compound and a sulfur source to polycondensation reaction in an aprotic organic solvent.

The PAS resin to which the process according to the present invention is applicable has an inherent viscosity $\eta_{ihn}$ [dl/g] in the range of 0.05 to 0.45 dl/g, preferably 0.1 to 0.4 dl/g, more preferably 0.12 to 0.35 dl/g. The inherent viscosity $\eta_{ihn}$ [dl/g], when being higher than 0.45 dl/g, sometimes gives rise to lowering in fluidity at the time of extrusion molding, thereby causing difficulty in granulation, whereas the inherent viscosity $\eta_{ihn}$ [dl/g], when being lower than 0.05 dl/g, sometimes brings about liability to fusing adhesion, thereby causing difficulty in granulation. According to the process of the present invention, a long-term continuous running is made possible by steadily removing volatile components without plugging up the opening portion of the vent even in the case of the above-mentioned polyarylene sulfide having a low molecular weight.

In the present invention, the inherent viscosity $\eta_{ihn}$ [dl/g] is determined by dissolving a polymer sample in an amount of 0.04±0.001 g in 10 milliliter of α-chloronaphthalene at 235° C. within 15 minutes, measuring the viscosity of the resultant solution of the polymer obtained in a thermostat at 200° C. and also measuring the viscosity of α-chloronaphthalene in which the polymer is not dissolved, so that the relative viscosity is obtained therefrom, and calculating the inherent viscosity by the following formula:

$\eta_{ihn}$=ln (relative viscosity)/polymer concentration

The PAS resin to which the process according to the present invention is applicable is separated from the polymerization reaction mixture for PAS resin which is obtained by subjecting a sulfur source and a dihalogenated aromatic compound to polymerization reaction in an aprotic organic solvent, and as the case may be, in the presence of a phase separating agent. There is no specific limitation on the method for separating the PAS resin in molten state containing the aprotic organic solvent. In the case where a solid component such as NaCl is contained in the mixture, it is preferable to remove the same in advance. In the case of causing phase separation, the polymer phase is obtainable by permitting the reaction mixture to stand so as to fractionate and separate the same. For instance, in the case where N-methyl-2-pyrrolidone (NMP) is used as the aprotic organic solvent, the polymer phase which has been fractionated and separated therefrom may be cleaned with the water/NMP mixed solvent in direct contact therebetween and thereafter, fractionated and separated from the solvent.

As the sulfur source to be use for the production of the PAS resin, mention is made of an alkali metal sulfide, an alkali metal hydrosulfide, hydrogen sulfide and the like. The alkali metal sulfide is specifically exemplified by lithium sulfide, sodium sulfide, potassium sulfide, rubidium sulfide, cesium sulfide and the like, of which lithium sulfide and sodium sulfide are preferable, and lithium sulfide is particularly preferable.

As the above-mentioned alkali metal sulfide, there may be used the product obtained by the reaction between an alkali metal hydrosulfide and a base. It is also possible to use an alkali metal hydrosulfide and a base together with the above-cited alkali metal sulfide.

As the sulfur source therefor, it is also possible to use hydrogen sulfide in combination with a base, and to use hydrogen sulfide in combination with a base together with the alkali metal sulfide and the alkali metal hydrosulfide.

As the above-mentioned alkali metal hydrosulfide, mention is made of lithium hydrosulfide, sodium hydrosulfide, potassium hydrosulfide, rubidium hydrosulfide, cesium hydrosulfide and the like, of which lithium hydrosulfide and sodium hydrosulfide are preferable, and lithium hydrosulfide is particularly preferable.

A variety of bases are usable, including an inorganic compound and an organic compound, provided that it is capable of converting the aforesaid alkali metal hydrosulfide to the alkali metal sulfide, or capable of converting the aforesaid hydrogen sulfide to the alkali metal hydrosulfide, or capable of efficiently neutralizing or accepting hydrogen halide which can be formed by the condensation reaction between the aforesaid alkali metal hydrosulfide or the hydrogen sulfide and a dihalogenated aromatic compound as described hereinafter with the proviso that the base is an acid acceptor which does not impair the objects of the present invention.

As an alkali metal hydroxide, mention is specifically made of lithium hydroxide, sodium hydroxide, potassium hydroxide, rubidium hydroxide, cesium hydroxide and the like, of which lithium hydroxide and sodium hydroxide are preferable, and lithium hydroxide is particularly preferable.

In addition, as a salt of an organic compound, there are preferably usable a metal salt of ω-hydroxycarboxylic acid, a metal salt of aminocarboxylic acid and the like.

As the dihalogenated aromatic compound, mention is made of well known compounds that are used for the production of polyarylene sulfide. Examples of the dihalogenated aromatic compound include dihalogenated benzene such as m-dihalogenated benzene and p-dihalogenated benzene, alkyl-substituted dihalogenated benzene, cycloalkyl-substituted dihalogenated benzene and the like such as 2,3-dihalogenated toluene; 2,5-dihalogenated toluene; 2,6-dihalogenated toluene; 3,4-dihalogenated toluene; 2,5-dihalogenated xylene; 1-ethyl-2,5-dihalogenated benzene; 1,2,4,5-tetramethyl-3,6-dihalogenated benzene; 1-n-hexyl-2,5-dihalogenated benzene; and 1-cyclohexy-2,5-dihalogenated benzene, aryl-substituted dihalogenated benzene such as 1-phenyl-2,5-dihalogenated benzene; 1-benzyl-2,5-dihalogenated benzene; and 1-p-toluyl-2,5-dihalogenated benzene, dihalobiphenyl such as 4,4'-dihalobiphenyl, dihalogenated naphthalene such as 1,4-dihalonaphthalene; 1,5-dihalonaphthalene; 2,6-dihalonaphthalene, and the like.

The amount of the dihalogenated aromatic compound to be used in the process is usually 0.90 to 1.30 mol, preferably 0.95 to 1.20 mol based on one mol of sulfur atom in the above-mentioned sulfur source in the case of not using a branching agent as described hereinafter. In the case of using a branching agent the amount of the sum of the dihalogenated aromatic compound and the branching agent is usually 0.90 to 1.30 mol, preferably 0.95 to 1.20 mol based on one mol of sulfur atom in the above-mentioned sulfur source.

The production of the PAS resin can be put into practice in the presence of a phase separation agent when necessary. As the phase separation agent, mention is made of a lithium halide such as lithium chloride and lithium fluoride; an alkali metal acetate such as lithium acetate and sodium acetate; an alkali metal sulfonate such as lithium sulfonate and sodium sulfonate; water and the like. Of these are preferable lithium halide, alkali metal acetate and water.

The amount of the phase separation agent to be used in the process needs only to be an amount of forming the polymer phase without specific limitation. Usually it is in the range of 0.05 to 3.0 mol, preferably 0.2 to 2.5 mol based on one mol of sulfur atom in the above-mentioned sulfur source.

It is possible in the production of the PAS resin to properly select and add at need, a branching agent to the reaction system in addition to the aforesaid phase separation agent, said branching agent being exemplified by a halogenated aromatic compound bearing an active hydrogen atom, a polyhalogenated aromatic compound bearing at least three halogen atoms, a halogenated aromatic nitro compound and the like.

As the halogenated aromatic compound bearing an active hydrogen atom, mention is made of a halogenated aromatic compound having a functional group which bears an active hydrogen atom such as amino group, thiol group, hydroxyl group and the like. It is specifically exemplified by dihaloanilines such as 2,6-dichloroaniline; 2,5-dichloroaniline; 2,4-dichloroaniline; and 2,3-dichloroaniline; trihaloanilines such as 2,3,4-trichloroaniline; 2,3,5-trichloroaniline; 2,4,6-trichloroaniline; and 3,4,5-trichloroaniline; dihaloaminodiphenyl ether such as 2,2'-diamino-4,4'-dichlorodiphenyl ether; and 2,4'-diamino-2',4-dichlorodiphenyl ether, any of the above-cited compound in which the amino group is replaced with a thiol group, hydroxyl group or the like.

As the above-cited polyhalogenated aromatic compound bearing at least three halogen atoms, mention is made of, for instance, 1,2,4-trichlorobenzene; 1,3,5-trichlorobenzene; 1,4,6-trichloronaphthalene and the like.

As the above-cited halogenated aromatic nitro compound, mention is made of, for instance, monohalonitrobenzenes such as 2,4-dinitrochlorobenzene; dihalonitrobenzenes such as 2,5-dichloronitrobenzene; dihalonitrodiphenyl ether such as 2-nitro-4,4'-dichlorodiphenyl ether; dihalonitrodiphenylsulfone such as 3,3'-dinitro-4,4'-dichlorodiphenylsulfone; monohalonitropyridine such as 2-chloro-3,5-dinitropyridine; dihalonitropyridine such as 2,5-dichloro-3-nitropyridine; various dihalonitronaphthalene and the like.

Through the use of the above-mentioned halogenated aromatic compound bearing an active hydrogen atom, a polyhalogenated aromatic compound bearing at least three halogen atoms, a halogenated aromatic nitro compound and the like, it is made possible to further improve various properties of the polymer to be formed according to the process of the present invention by increasing the degree of branching of the polymer to be formed, further increasing the molecular weight thereof, and forming a gel-formable polymer in which the melt fluidity is lowered.

In the process according to the present invention, the branching agent may be used alone or in combination with at least one other species.

The amount of the branching agent to be used in the process is usually 0.0005 to 0.05 mol, preferably 0.001 to 0.02 mol based on one mol of sulfur atom in the above-mentioned sulfur source.

In summarizing the working effects and advantages of the present invention it is made possible to provide a process for removing volatile components in a polyarylene sulfide resin which process is capable of steadily and economically removing volatile components in the polyarylene sulfide resin well suited for use in electrical parts, electronic parts and highly rigid materials by means of a simple and convenient installation without necessitating expensive machinery or equipment such as a dryer and in particular, is capable of long-term continuous running without plugging up the opening portion of a vent even in the case of a polyarylene sulfide having a low molecular weight in the case of removing volatile components by means of an extruder.

In what follows, the present invention will be described in more detail with reference to comparative example and working examples, which however shall never limit the present invention thereto.

EXAMPLE 1

{Preparation of Polyphenylene Sulfide (PPS)}

Into a 600 liter polymerization vessel were placed 210 liter of N-methyl-2-pyrrolidone (NMP) containing 500 mol (23 kg) of lithium sulfide, 500 mol (73.5 kg) of p-dichlorobenzene, 25 mol (1 kg) of lithium hydroxide monohydrate and 250 mol (4.5 kg) of water. Subsequently the mixture in the vessel was reacted at 260° C. for 3 hours under the condition of stirring. After the completion of the reaction, to the reaction product were gradually added aqueous solution of ammonium chloride containing 2.1 kg of ammonium chloride and 67 kg of water and 50 liter of NMP so as not to lower the temperature of the reactants. After the completion of adding the same, stirring was discontinued and the resultant mixture was allowed to stand so as to separate the lower phase as the polymer phase containing NMP and the upper phase as the solvent phase from each other. A sample was collected from a part of the lower phase as the polymer phase, and analyzed for its chemical composition. As a result, the sample consisted of 55% by weight of PPS, 40% by weight of NMP and 5% by weight of others. The sampled polymer phase was cleaned with a large amount of hot water, and the inherent viscosity $\eta_{ihr}$ thereof was measured. As a result, it proved to be 0.23 [dl/g].

{Removal of Volatile Components in PAS Resin}

The lower phase as the concentrated polymer phase which had been separated was introduced in the feed portion of a twin-screw extruder equipped with a front vent and a rear vent (manufactured by Japan Steel Works, Ltd. under the trade name "TEX30α-42B-5V" with a screw diameter of D) via a thermally insulated stainless steel tube. The opening length of the front vent of the extruder was 9D, and the distance between a terminal position of the screws in a kneading portion and the opening portion of the front vent was 5.6 D. In that case, the feeding amount of the polymer phase containing the NMP was controlled with a control valve which had been installed midway on the above-mentioned stainless steel tube.

The twin-screw extruder was operated at a cylinder temperature of 310° C., die temperature of 290° C., the number of rotations of screws of 200 rpm, quantity of discharge of PPS of 10 kg/hour, rear vent pressure of 660 torr and front vent pressure of 10 torr, while the amount of the NMP in the PPS which was discharged through the outlet of the extruder was determined by means of a purge trap gas chromatography. The results are given in Table 1, including the opening length of the front vent of the extruder, the distance between a terminal position of the screws in a kneading portion and the opening portion of the front vent, the amount of the NMP in the PPS which was discharged through the outlet of the extruder and continuous operating period of time.

EXAMPLE 2

The procedure in Example 1 was repeated to remove volatile components in polyphenylene sulfide except that use was made of PPS having an inherent viscosity $\eta_{ihr}$ of 0.17 [dl/g], the opening length of the front vent of the extruder was set on 6 D, the distance between a terminal position of the screws in a kneading portion and the opening portion of the front vent was set on 8.6 D, and the front vent pressure on 200 torr. The results are given also in Table 1.

COMPARATIVE EXAMPLE 1

The procedure in Example 2 was repeated to remove volatile components in polyphenylene sulfide except that the opening length of the front vent of the extruder was set on 2.4 D, and the distance between a terminal position of the screws in a kneading portion and the opening portion of the front vent was set on 1.0 D. The results are given also in Table 1.

TABLE 1

| | Opening length of front vent | Distance between terminal position of screws in kneading portion and opening portion of front vent | Residual NMP amount (ppm) | Continuous operating time (hour) |
|---|---|---|---|---|
| Example 1 | 9 D | 5.6 D | 100 | ≧2 weeks (*) |
| Example 2 | 6 D | 8.6 D | 400 | ≧2 weeks (*) |
| Comparative Example 1 | 2.4 D | 1.0 D | — | about a day (**) |

{Remarks}
(*): no adhesion to opening portion
(**): plugged up due to adhesion to opening portion As is clearly seen from Table 1, by using the extruder equipped with specific vents according to the present invention, it is possible to efficiently remove NMP. In addition, adhesion of the resin was suppressed, enabling continuous operation for at least 2 weeks without plugging up the outlet of the extruder.

What is claimed is:

1. A process for removing at least one volatile component from a polyarylene sulfide resin, comprising:
   producing said polyarylene sulfide resin by subjecting a sulfur source and a dihalogenated aromatic compound to polymerization reaction in an aprotic organic solvent,
   removing at least one volatile component from said polyarylene sulfide resin by using an extruder
      which is equipped with a front vent having an opening length in the range of 4D to 11D, wherein D stands for a screw diameter, and which has a distance between a terminal position of a screw in a kneading portion and the opening portion of the front vent in the range of 4D to 15D.

2. The process according to claim 1, wherein the extruder which is equipped with said front vent is a twin-screw extruder.

3. The process according to claim 1, wherein the removal of said volatile component is carried out at a temperature of the polyarylene sulfide resin in the range of 280 to 400° C. and at a reduced pressure.

4. The process according to claim 1, wherein the aprotic organic solvent is N-methyl-2-pyrrolidone.

5. The process according to claim 1, wherein said extruder has two front vents.

6. The process according to claim 5, comprising:
separating said polyarylene sulfide resin from a polymerization reaction product,
heating said resin to 265 to 300° C., and
introducing the melted resin which contains said aprotic organic solvent into said extruder.

7. The process according to claim 1, wherein an amount of said dihalogenated aromatic compound is 0.90 to 1.30 mol based on one mol of sulfur atom in the said sulfur source.

8. The process according to claim 1, comprising extruding said resin from the extruder at a temperature of from 280 to 350° C.

9. The process according to claim 1, comprising extruding said resin into water having a temperature of from 40 to 95° C.

10. The process according to claim 8, comprising cutting-off and palletizing said resin after extruding.

11. The process according to claim 1, wherein said aprotic organic solvent is an amide compound, a lactam compound, an urea compound, an organosulfur compound, a cyclic organophosphorus compound or mixtures thereof.

12. The process according to claim 1, wherein said aprotic organic solvent is N-alkylcaprolactam, N-alkylpyrrolidone or mixtures thereof.

13. The process according to claim 1, wherein said resin is a copolymer.

14. The process according to claim 1, wherein said resin is a copolymer having a unit selected from the group consisting of a meta-phenylene sulfide unit, an ortho-phenylene sulfide unit, a p,p'-diphenyleneketone sulfide unit, a p,p'-diphenylenesulfone sulfide unit, a p,p'-biphenylene sulfide unit, a p,p'-di-phenylene methylene sulfide unit, a p,p'-diphenylenecumenyl sulfide unit and a naphthyl sulfide unit.

15. The process according to claim 1, wherein said resin is crosslinked.

16. The process according to claim 1, wherein said resin is linear.

17. The process according to claim 1, wherein said resin is branched.

18. The process according to claim 1, wherein said resin has an inherent viscosity $\eta_{ihn}$ [dl/g] in the range of 0.05 to 0.45 dl/g.

19. The process according to claim 1, which is continuous.

20. The process according to claim 1, wherein said sulfur source is an alkali metal sulfide, an alkali metal hydrosulfide, or hydrogen sulfide.

* * * * *